(12) United States Patent
Steinbeck et al.

(10) Patent No.: US 7,168,835 B2
(45) Date of Patent: Jan. 30, 2007

(54) ALIGNING DEVICE FOR A HEADLIGHT

(75) Inventors: Herbert Steinbeck, Muehlacker (DE); Hans Weiner, Muehlacker (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 164 days.

(21) Appl. No.: 10/816,206

(22) Filed: Apr. 2, 2004

(65) Prior Publication Data
US 2004/0257828 A1   Dec. 23, 2004

(30) Foreign Application Priority Data
Apr. 3, 2003  (DE) ................ 103 15 140

(51) Int. Cl.
F21V 19/02 (2006.01)

(52) U.S. Cl. ................ 362/523; 362/549; 362/273; 362/289

(58) Field of Classification Search ................ 362/273, 362/289, 512, 514, 523, 549
See application file for complete search history.

(56) References Cited

U.S. PATENT DOCUMENTS 4,751,619 A * 6/1988 Philippe et al. ............. 362/549
5,122,934 A    6/1992 Schmidt
6,685,350 B2   2/2004 Esser et al.
2002/0118549 A1  8/2002 Esser et al.

FOREIGN PATENT DOCUMENTS

| DE | 40 17 701 | 12/1991 |
| DE | 101 04 906 A1 | 8/2002 |
| FR | 2 829 729 A1 | 7/1938 |
| FR | 2 719 269 A1 | 11/1995 |

* cited by examiner

Primary Examiner—Stephen F Husar
(74) Attorney, Agent, or Firm—Crowell & Moring LLP

(57) ABSTRACT

An aligning device for a headlight in a vehicle body of a motor vehicle has an adjusting element which is arranged between the vehicle body and a carrying part of the headlight. The adjusting element comprises an elastic ring clamped in between holding parts by way of an adjusting screw, which elastic ring is supported in a ring sleeve of the carrying part, and the adjusting screw is held on the vehicle body in a threaded nut.

5 Claims, 4 Drawing Sheets

ALIGNING DEVICE FOR A HEADLIGHT

BACKGROUND AND SUMMARY OF THE INVENTION

The application claims the priority of application Ser. No. 103 15 140.0 filed Apr. 3, 2003, the disclosure of which is expressly incorporated by reference herein.

The invention relates to an aligning device for a headlight in the body of a vehicle, having an adjusting element which is arranged between the vehicle body and a carrying part of the headlight.

From German Patent Document DE 40 17 701 A1 (Corresponding to U.S. Pat. No. 5,122,934), an adjusting device for a housing of a headlight in a motor vehicle is known, which comprises a holding element in a holding ring of a headlight and a fastening element penetrating the holding element. For compensating dimension tolerances of the vehicle body parts, the holding element can be fixed in different positions.

It is an object of the invention, to create an aligning device for a headlight in a motor vehicle which can be mounted with minimal expenditures and by means of which an aligned position of the headlight can be implemented in a simple manner in a receiving device of the vehicle body.

According to the invention, this object is achieved by providing an aligning device for a headlight supported by a vehicle body of a motor vehicle, having an adjusting element which is arranged between the vehicle body and a carrying part of the headlight, wherein the adjusting element comprises an elastic ring which is clamped in between holding parts by means of an adjusting screw and is supported in a ring sleeve of the carrying part, and wherein the adjusting screw is held at the vehicle body in a threaded nut in several possible adjusting positions of the headlight.

Additional advantageous features of preferred embodiments of the invention are described herein and in the claims.

Important advantages achieved by means of the invention are that the headlights can be installed in the motor vehicle in a precisely aligned manner. For this purpose, it is advantageously provided according to the invention that the adjusting element comprises of an elastic ring clamped by way of an adjusting screw between holding parts, which ring is supported in a ring sleeve of the carrying part, and the adjusting screw is held at the vehicle body in a threaded nut in possible adjusting positions of the headlight. As a result, it is advantageously achieved that the headlight can be inserted in its receiving device in the fender with a precise uniform course of the joints and can be fixed in this position at the vehicle body by way of the aligning device.

In order to create an operationally reliable device, it is also provided according to the invention that the holding parts comprise two sleeves which are arranged coaxially to one another and can be slid inside one another. The elastic ring is arranged clamped in between opposite flanges of the sleeves. In the one sleeve facing the vehicle body, a sleeve section of the other sleeve is held in a fitted-in manner, the adjusting screw being supported by way of a disk on the end face side of the other sleeve. The adjusting screw can be fastened to a bent-away leg of the vehicle body in a threaded nut, for example, in a snap nut or in a rivet nut.

According to the invention, the elastic ring of the device is constructed so that it can be radially braced by means of the adjusting screw as a function of a pressing force of the sleeve flanges and so that, in the case of the arrangement in different possible angular positions, the adjusting screw can be fixed corresponding to the "correct" position of the headlight. This permits a compression of the elastic ring and thus a radial swelling-out of this ring for achieving a holding force or clamping force in the ring sleeve of the carrying part.

So that the adjusting screw can be screwed in a simple manner by way of a tool, the screw head has a hexagon insert bit and, in addition, an hexagon socket. Furthermore, the free end of the adjusting screw is provided with a hexagon section, so that the adjusting screw can be turned also from this side, which becomes necessary when the screw head cannot be reached by the tool.

According to another embodiment of the invention, the elastic ring can be arranged in the adjusting element between two L-shaped holding parts and can be held in a clamped-in manner between tightening disks held on an adjusting screw. The elastic ring of the adjusting element is arranged in a receiving can placed in front and held in a ring sleeve of the carrying part. A gap is provided between the holding parts so that the elastic ring can be compressed. In this embodiment, the tightening disks of the adjusting element, on the one side, rest against the screw head of the adjusting screw and, on the other side, rest on an inserted spacing sleeve, which spacer sleeve is supported by means of its end facing away from the tightening disk on a bent-away leg of the vehicle body. In this embodiment, the aligning device of the headlight, with respect to its function, corresponds to the construction of the embodiments described above, which can be screwed into the carrying part of the headlight, permitting in a simple manner also a subsequent installation into existing systems.

According to another embodiment of the invention, at least two mutually facing cup springs can be arranged between two tightening disks or one tightening disk of the adjusting element and the screw head of the tightening screw, which cup springs extend radially to the interior wall surface of the ring sleeve of the carrying part for the headlight.

Furthermore, according to another embodiment, the elastic ring is arranged between two mutually diverging cup springs in the adjusting element, and the cup springs rest against the tightening disk.

Other objects, advantages and novel features of the present invention will become apparent from the following detailed description of the invention when considered in conjunction with the accompanying drawings.

BRIEF DESCRIPTION OF THE DRAWINGS

FIG. 7 is a sectional view of another embodiment of an aligning device with clamped-in cup springs and an elastic ring situated in-between.

DETAILED DESCRIPTION OF THE DRAWINGS

Figure 4:
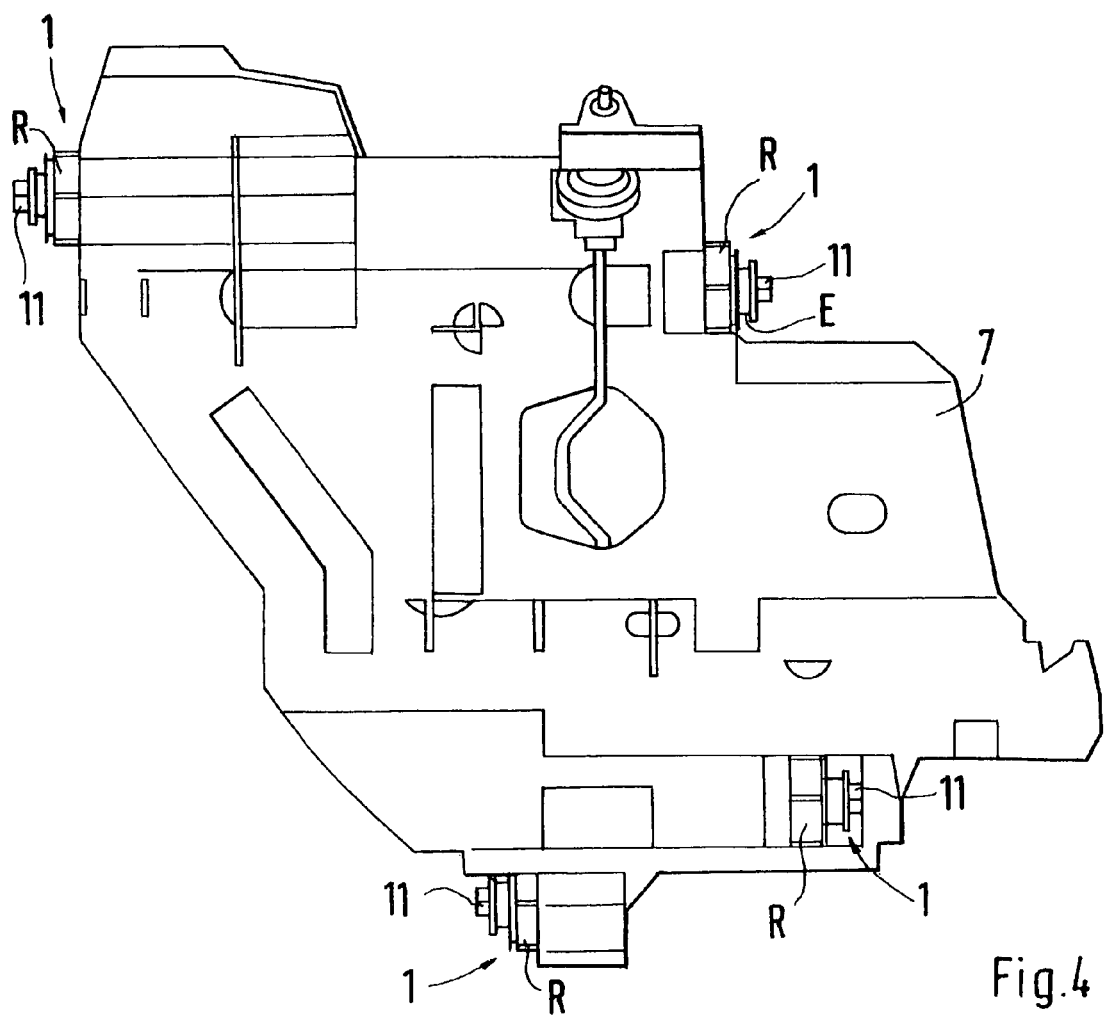
FIG. 4 is a top view of a carrying part for the headlight with four aligning devices, constructed according to preferred embodiments of the invention.

An aligning device 1 for a headlight of a motor vehicle in a cutout of a fender comprises an adjusting element E which has an elastic ring 6 clamped in between two holding parts 3, 4 by means of an adjusting screw 5. The device 1 is arranged in a ring sleeve R of a carrying part 7 for the headlight S. On the whole, four aligning devices 1 are provided in the carrying part 7, as illustrated in detail in FIG. 4.

The holding parts comprise essentially two sleeves 3 and 4, which are arranged coaxially to one another and whose sleeve sections 3a and 4a are constructed to be slidable in one another, for the purpose of which one sleeve section 4a of the sleeve 4 projects into the sleeve section 3a of the additional sleeve 3. Both sleeves 3 and 4 have flanges 3c and 4c, between which the elastic ring 6 is held so that it is clamped in and can be braced. Preferably, the ring sleeve R of the carrying part 7 made of plastic (corresponding to the carrying part 7) has a screwed-in ring sleeve 10 made of plastic or metal, which is therefore independent of the setting properties of the carrying part material 7.

The adjusting screw 5 is supported by means of a disk 12 on the face of the sleeve 4 by way of a head 11. The free end of the screw 5 is fixed by way of a thread section with a threaded nut, such as a metallic snap nut 13 or a rivet nut 14, on a leg 15 of the vehicle body 16.

Figure 1:
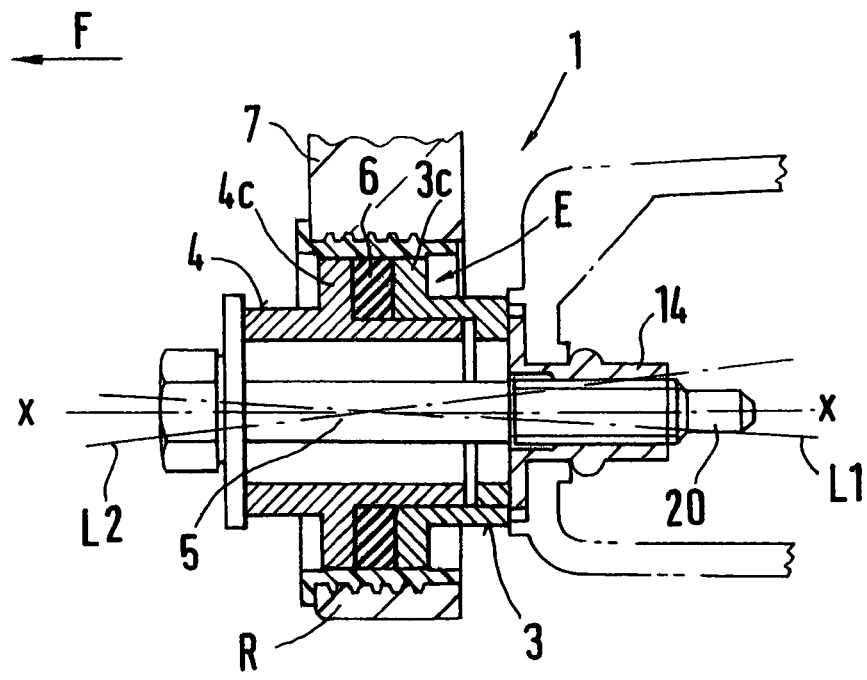
FIG. 1 is a sectional view of an installed forward aligning device with an elastic ring clamped in between flanges of holding parts, such as sleeves, constructed according to a preferred embodiment of the invention.
Figure 2:
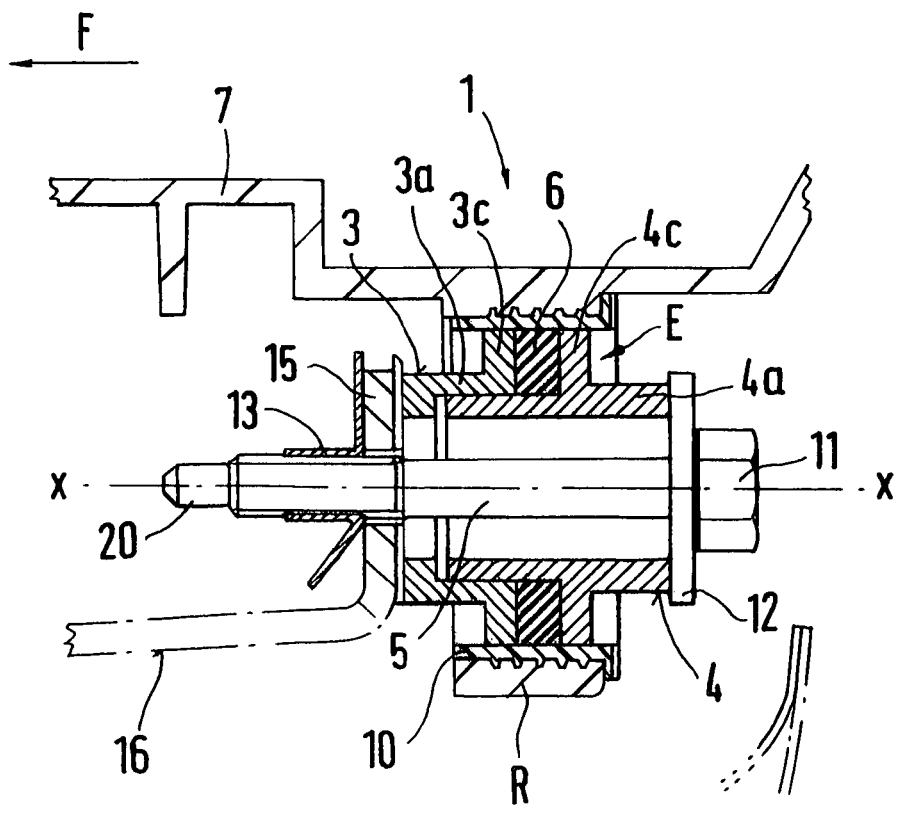
FIG. 2 is a sectional view of an installed rearward aligning device, constructed according to another preferred embodiment of the invention.
Figure 3:
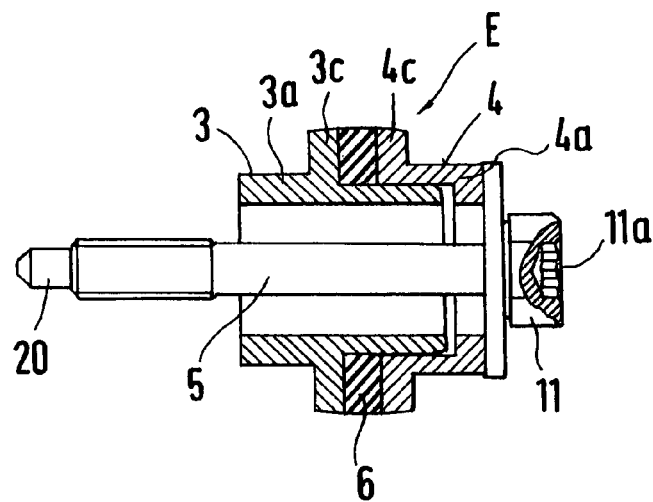
FIG. 3 is a sectional view of a removed aligning device, constructed according to a preferred embodiment of the invention.

For aligning the headlight in its receiving device in the fender, the headlight connected with the carrying part 7 is held in a "correct" position and the adjusting screw 5 is then tightened, in which case the elastic ring 6 is braced by way of the flanges 3c, 4c such that the ring 6 can press against the interior wall of the ring sleeve 10. The position of the adjusting screw 7 may deviate from the illustrated position in the plane x—x, as indicated, for example, by the dash-dotted lines L1 and L2 in FIG. 1. Such a position of the adjusting screw 5 occurs when, for example, the leg 15 of the vehicle body 16 is not situated at a right angle with respect to the carrying part or the course of the joints in the cutout of the vehicle body is not uniform for other reasons. The angle adjusting range of the screw 7 is defined by the clearance, as indicated in FIG. 1 at L1, L2. The axial adjusting range X, X1 is defined by the sleeves 3 and 4.

The position of parts 3 and 4 can be mutually exchanged because the tightening element is functionally symmetrical. The adjusting screw 5 has a hexagon at the head 11 as well as a hexagon socket 11a. In addition, the free end of the adjusting screw 5 is provided with a hexagon insert bit 20, so that the adjusting screw 5 can be tightened also from this end by means of a tool.

Figure 8:
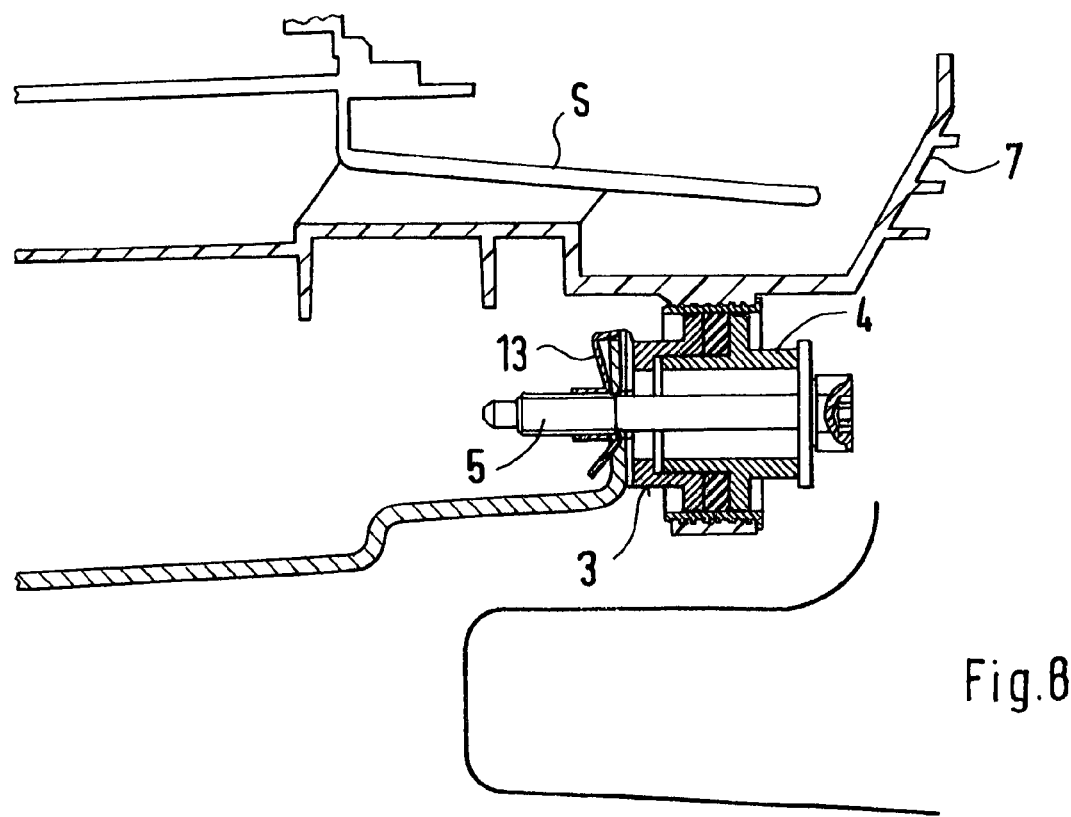
FIG. 8 is a view of an embodiment according to FIG. 3 made of a plastic material.

According to the embodiment of FIG. 8, the sleeves 3, 4 are made of plastic and the holding shell 7 also consists of plastic, in which case no reinforcement or insert 10 is provided.

Figure 5:
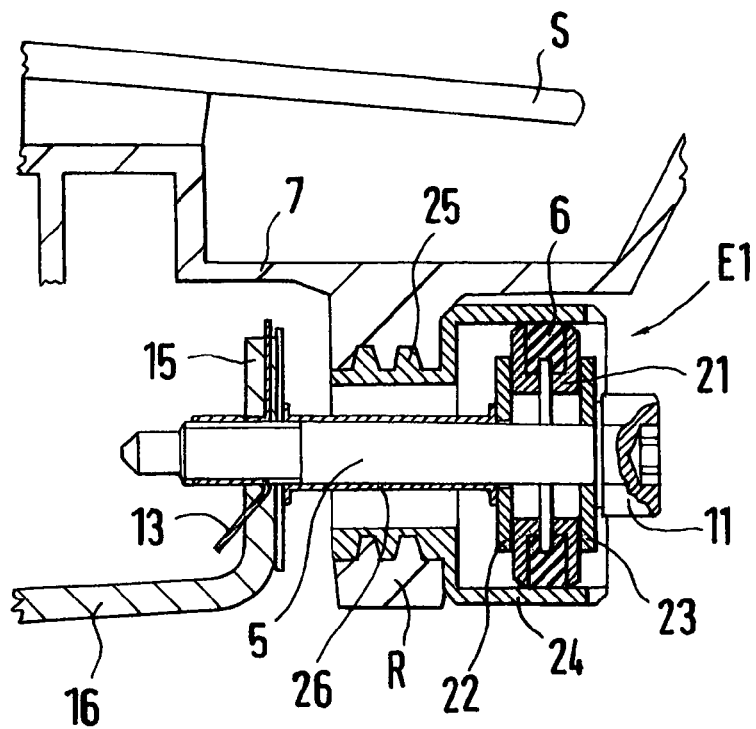
FIG. 5 is a sectional view of another embodiment of an aligning device having a floatingly disposed elastic ring.

According to another embodiment of FIG. 5, in the case of the adjusting element E1, the elastic ring 6 is arranged between two L-shaped holding parts 21, which is disposed between tightening disks 22, 23 held on the adjusting screw 5. One tightening disk 23 is supported at the screw head, the other tightening disk 22 being supported at one end of the spacer sleeve 26, and the facing-away free end of the spacer sleeve 26 resting against the leg 15 of the vehicle body 16. A gap is provided between the two holding parts 21 and permits a compression of the elastic ring 6.

In this embodiment according to FIG. 5, the receiving can 24 is provided with a can attachment 25 which can be screwed or inserted into the ring sleeve R of the carrying element 7 for the headlight S. The receiving can 24 is placed in front of the ring sleeve R. A tightening of the tightening screw 5 ensures a clamping of the elastic ring 6 in the receiving can 24.

Figure 6:
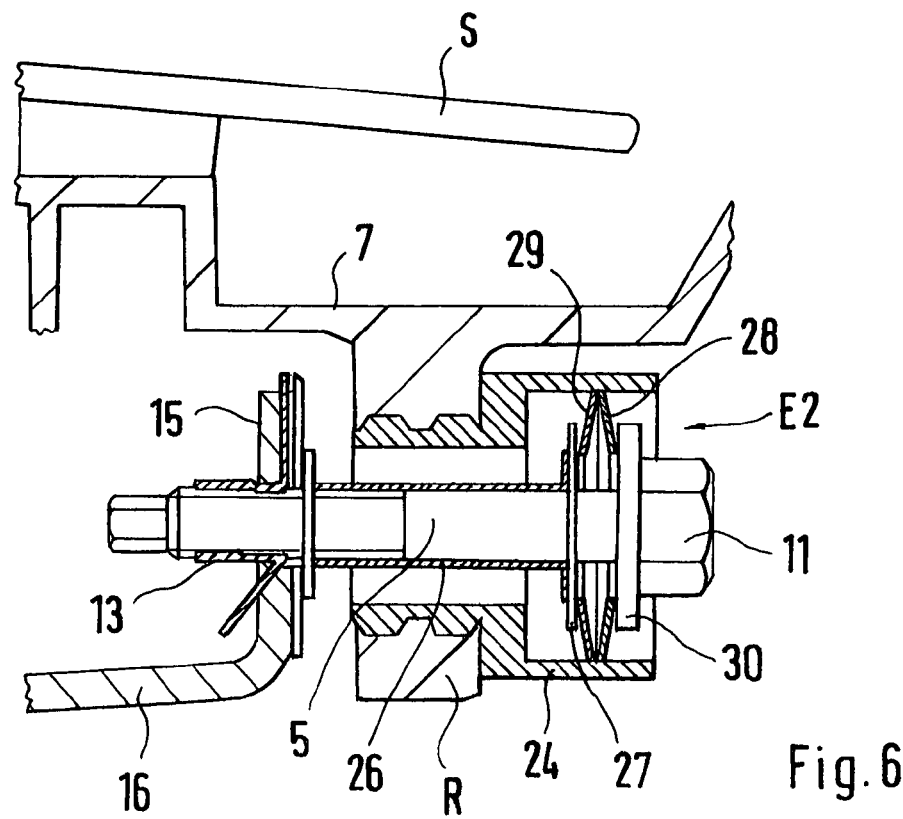
FIG. 6 is a sectional view of another embodiment of an aligning device with clamped-in cup springs.

According to another embodiment of FIG. 6, mutually oppositely oriented cup springs 28, 29 are held, in the case of the adjusting element E2, in the receiving can 24, in a clamped-in manner between a tightening disk 30 of the adjusting screw 5 and another tightening disk 27 supported at the spacer sleeve 26, which cup springs 28, 29 are supported on the interior surface of the receiving can 24 and, after a tightening of the adjusting screw 5, cause a fixing of the aligning device E2. The receiving can 24 is constructed corresponding to the embodiment of FIG. 5 and is fastened in the carrier part 7 of the headlight S, and the adjusting screw 5 is also connected with the vehicle body 16 corresponding to the embodiment of FIG. 5.

Figure 7:
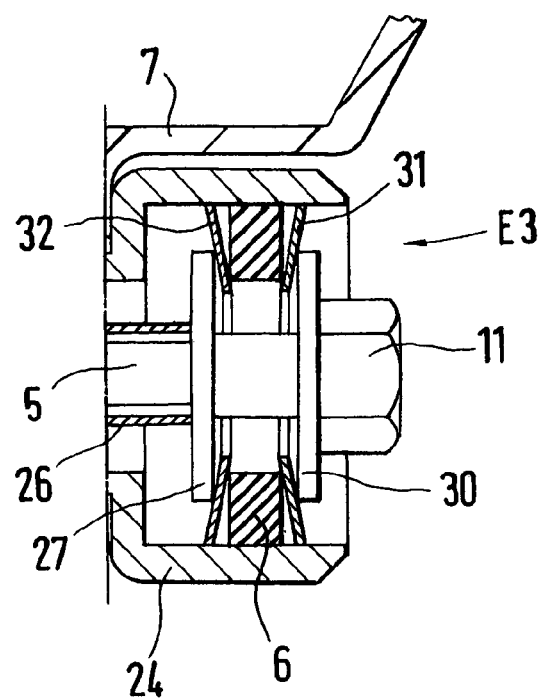

According to another embodiment of FIG. 7, in the case of an adjusting element E3, two cup springs 31, 32 are arranged between the tightening disk 27 and the tightening disk 30, the elastic ring 6 being situated between the two cup springs 31, 32. These cup springs 31, 32 are arranged in a mutually diverging manner. When the adjusting screw 5 is tightened, the cup springs 31, 32 and the elastic ring 6 situated in-between are prestressed and cause a clamping of the device E3 in the receiving can 24.

The supporting ring or the coordinated gaps have the result that, on the hand, the adjusting screw 5 is tightened "to a lock"—the shrinking of the rubber ring causes no loosening of the screwed connection—and, on the other hand, a crushing of the rubber ring is prevented.

As a result of the automatic adjustment without any bracing or twisting, a uniform loading of the four-point bearing (better damping) is also achieved.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. Aligning device for a headlight supported by a vehicle body of a motor vehicle, having an adjusting element which is arranged between the vehicle body and a carrying part of the headlight, wherein the adjusting element comprises an elastic ring which is clamped in between holding parts by an adjusting screw and is supported in a ring sleeve of the carrying part, the adjusting screw is held at the vehicle body in a threaded nut in several possible adjusting positions of the headlight and, a first ring sleeve made of plastic or metal is insertable into a second plastic ring sleeve of the carrying part for the headlight, on which the first ring sleeve the elastic ring is radially supported.

2. Aligning device for a motor vehicle headlight, comprising an adjusting element which is operatively arranged between a motor vehicle body and a carrying part of the headlight, the adjustment element comprising an adjusting screw, tightening disks operatively arranged on the adjusting screw, cross-sectionally L-shaped holding parts operatively arranged between the tightening disks, and an elastic ring operatively arranged between the holding parts such that it can be clamped between the tightening disks held on the adjusting screw.

3. Device according to claim 2, wherein the carrying part includes a ring sleeve configured to hold a receiving can in which the elastic ring is operatively arranged.

4. Device according to claim 3, wherein one of the tightening disks rests against a screw head of the adjusting screw and another of the tightening disks rests against an inserted spacer sleeve has an end facing away from the another of the tightening disks so as to be supported on a bent-away leg of the vehicle body.

5. Device according to claim 4, wherein the receiving is placeable in front of the ring sleeve and has a threaded can section configured to be screwed into the ring sleeve.

* * * * *